United States Patent [19]

Rigby

[11] Patent Number: 4,482,418

[45] Date of Patent: Nov. 13, 1984

[54] BONDING METHOD FOR PRODUCING VERY THIN BOND LINES

[75] Inventor: Eugene B. Rigby, Tucson, Ariz.

[73] Assignee: International Business Machines Corporation, Armonk, N.Y.

[21] Appl. No.: 524,167

[22] Filed: Aug. 17, 1983

[51] Int. Cl.³ ............................................. B32B 31/00
[52] U.S. Cl. .................................... 156/276; 29/603; 65/43; 156/89; 156/155; 156/310; 156/319; 156/325; 156/281; 360/120; 428/329; 428/331; 428/420; 428/900
[58] Field of Search ................ 156/89, 310, 155, 319, 156/276, 325, 281; 65/43; 428/420, 331, 329, 900; 360/120; 29/603

[56] References Cited

U.S. PATENT DOCUMENTS

| | | | |
|---|---|---|---|
| 3,578,920 | 5/1971 | Okamoto et al. | 360/120 |
| 3,758,362 | 9/1973 | Brown | 156/310 |
| 3,824,148 | 7/1974 | Lopatin | 156/310 |
| 3,860,476 | 1/1975 | Moore | 156/310 |
| 3,861,978 | 1/1975 | Connole et al. | 156/319 |
| 3,993,844 | 11/1976 | Kiger et al. | 156/89 |
| 4,039,702 | 8/1977 | DiBugnara et al. | 427/93 |
| 4,182,643 | 1/1980 | Calderon, Jr. et al. | 156/151 |
| 4,298,899 | 11/1981 | Argumedo et al. | 360/122 |

OTHER PUBLICATIONS

IBM Technical Disclosure Bulletin, vol. 16, No. 7, Dec. 1973, "Multiple Component Deposition", by E. B. Rigby, p. 2369.

IBM Technical Disclosure Bulletin, vol. 21, No. 1, Jun. 1978, "Diffuse Surface Preparation for Use with Holographic Interferometry", by W. C. Hall, D. H. McMurtry and E. B. Rigby, p. 328.

*Primary Examiner*—John J. Gallagher
*Attorney, Agent, or Firm*—Francis A. Sirr

[57] ABSTRACT

A bonding method which uses two solutions, one being anionic and the other being cationic, to lay down alternating layers of particles of accurate dimension onto members which are to be bonded. Thereafter, the layers are placed in contact, and the members are bonded together by diffusion bonding techniques.

12 Claims, No Drawings

BONDING METHOD FOR PRODUCING VERY THIN BOND LINES

DESCRIPTION

Technical Field

This invention relates to the field of bonding, and more particularly to bonding methods useful in forming a very thin, nearly nonexistent, gap between two members. Two exemplary uses are to form a nonmagnetic transducing gap in magnetic transducing heads, and to bond an electrically nonconductive shim between two electrically conductive members.

BACKGROUND OF THE INVENTION

While the present invention is of general bonding utility, it will be described in the environment of two specific arts, namely bonding which produces magnetic or electrical isolation, without limitation thereto.

The data density which can be placed onto magnetic recording media is limited by a number of physical parameters, one of which is the gap-width of the nonmagnetic gap of the transducing head which is to write and/or read the media's data track. Gap width is measured in the direction of relative movement between the head and the magnetic recording media being transduced by the head. A great deal of prior art effort has been expended in attempts to produce thin, uniform and durable head gaps. The following are exemplary, and are incorporated herein by reference for the purpose of illustrating the state of the art and the background of the present invention.

The concept of using heat/pressure bonding methods to glass-bond adjoining layers to form the transducing gap of a magnetic head, is well known, and U.S. Pat. No. 4,182,643 is exemplary.

The use of alumina films to support the brittle ferrite material of a magnetic head, so that chipping and erosion do not occur during operation of the head slider, is taught by U.S. Pat. No. 4,298,899. In this patent, the alumina films are sputter deposited on two ceramic members. The alumina films are then bonded with a low temperature glass by diffusion or with an epoxy, thereby joining the ceramic members.

The use of colloids or slurries to deposit a layer, such as glass, on an article is known. U.S. Pat. No. 4,039,702 recognizes prior art where thin, uniform glass coatings are formed on semiconductor or electronic articles of manufacture by a variety of means, e.g. sputtering, evaporation or condensation (silox process). This patent seeks to improve a glass coating method which produces sedimentation from a fluid suspension of glass particles by means of centrifugal force; and more particularly the improvement is achieved by adding a polar substance such as hydrochloric acid, ammonium hydroxide or hydrogen peroxide to the fluid suspension. While the preferred means to coat the article is by centrifugal force, any means well known to the art whereby suspended particles may be caused to agglomerate, and thereby settle, is said to be within this patent's teaching.

The IBM TECHNICAL DISCLOSURE BULLETIN of June 1978, at page 328, describes how a very thin, uniform layer of titanium dioxide or alumina may be formed on the surface of a substrate, for the purpose of providing the surface with a diffusely reflecting medium, useful when analyzing the surface using holographic interferometry. More specifically, the surface is first cleaned, followed by dipping into an aqueous silica bath to provide a hydrophilic surface. Excess silica is washed off with water, and the surface is dried. The surface is then placed in a water-soluble inorganic polymer, followed by dipping into a slurry of titanium dioxide or alumina. Excess particles are removed by water washing, followed by air drying.

The IBM TECHNICAL DISCLOSURE BULLETIN of December 1973, at page 2369, also describes a method of depositing monolayers on a substrate, for example, in the making of magnetic media.

THE INVENTION

An object of the present invention is to bond two surfaces. Similar or dissimilar ceramic members, as might be used in the making of magnetic recording heads, can be bonded by the use of this invention. Ni-Zn ferrite is an exemplary material.

This invention has also been used to bond a thin, dense, electrically nonconductive alumina shim (5 to 10 mils thick) between two blocks of electrically conductive titanium carbide (70%) aluminum oxide (30%) material ($TiC.Al_2O_3$).

In these arts the bond line must be very thin, in the range of from a few Angstroms to about 5 microns. In the magnetic head art, particularly, these bond lines must be of very uniform thickness, and must be durable.

Most ceramics, of the type used in head manufacture, exhibit a positive electrical charge in the presence of water, and the method of the present invention will be described as it is used to bond two such surfaces. Howver, the present invention is also usable with materials which exhibit a negative surface charge in the presence of water.

In either event, practice of the present invention requires the use of two water/colloid solutions of opposite electrical charge, i.e. one must be cationic and the other must be anionic.

The term colloid, as used herein, is conventional, and relates to the physical chemistry phenomena where particles are so small that the particle's surface area is much larger than its volume; and, for example, the particles do not settle out of the liquid suspension by gravity, and are small enough to pass through filter membranes.

The first water/colloid solution can, for example, be the negative charge solution. More specifically, this solution is preferably a 1% solution of colloidal silica ($SiO_2$) of 150-Angstrom size. An exemplary brand is LUDOX colloidal silica by E. I. duPont de Nemours & Co. It is recognized that colloid size may range from the smallest commercially available size, to as large as perhaps ½ micron. Cationic water/colloid solutions can also be provided by using polymers, such as acrylic water-soluble polyelectrolytes. These polymers are also usable in the present invention. An exemplary brand is RETEN by Hercules, Inc.

The second water/colloid positive charge solution can, for example, be a 1% solution of alumina ($Al_2O_3$), of 100-Angstrom size. An exemplary brand is CATAPAL SB by the Conoco Chemicals Division of Continental Oil Company.

The colloid concentration of these solutions can vary in the range of about 0.1 to 5 percent. Generally, the smaller the particle size, the more dilute the solution may be. However, in the method of the present invention, when the concentration is too low, the solution does not exhibit good covering power, and when the concentration is too high, particle agglomeration may begin to occur.

In the practice of the present invention to bond two ceramic surfaces, the first step is to clean the two surfaces. The brand LIQUINOX cleaner is preferred as a cleaning agent. The surface(s) to be bonded are preferably scrubbed with the cleaning agent, rinsed with water, washed with proponal, and then again rinsed with water.

The two surfaces should be quite smooth, as will be appreciated by those skilled in the head manufacturing art.

One or both of the flat, clean surfaces which are to be bonded one to the other, is now placed in the first, cationic solution. This procedure causes the surface to be covered with a monolayer of silica. If multi-silica layers in fact exist on the surface when it is removed from the solution, all but the first layer is removed by water washing the surface with deionized water. Thereafter, the surface is allowed to air dry. The surface is now covered by a 150-Angstrom thick layer of silica.

The surface is now placed in the second anionic solution. In this solution, the silica layer on the surface appears as a negative surface, and a monolayer of alumina, 100 Angstroms thick, deposits thereon. Again, the part is removed and DI water washed to insure that the alumina layer is only one layer thick.

It has been observed that the cationic/anionic attraction of the various layers insures that a monolayer remains after the aforesaid steps of gentle washing.

At this time, the surface to be bonded is covered by a layer 250 Angstroms thick. This will be the bond-line thickness, unless the process is repeated. Each time the process is repeated, the bond-line thickness increases by 250 Angstroms. Also, if both surfaces are so treated, then the bond-line thickness is twice that which results from treating one of the two surfaces to be bonded.

The last step of the process involves placing the two alumina surfaces in contact under an exemplary pressure of about 3000 psi., and at a temperature of from 800° to 1300° C., for from one to two hours, preferably in a nitrogen atmosphere.

The apparatus for effecting diffusion (pressure/heat) bonding is not critical to the present invention. However, it is preferred to first place the surfaces to be bonded in direct physical contact; then use rubber cement to hold the articles together; then bury the articles in a mass of $Al_2O_3$ powder contained within a high temperature mold; and then apply pressure to the powder mass as the mass is heated by a surrounding electrical heater.

As is apparent from the above description, the bond-line thickness can be controlled either by multi-process steps, or by varying the size of the colloid particles. In practice, it is preferred that the smallest size particle be used which does not result in excessive cycling through the process. For example, 10 to 20 cycles of the process are preferred to a larger particle size and only one or two cycles of the process.

The above solutions are preferably of a pH about 4.

The aforesaid pressures, temperature, and time are selected as a function of whatever colloid materials are selected for use, and as a function of the materials being bonded.

If the aforesaid cationic polymer is selected for use in the above recited first solution, one finds that the bond-line thickness is only that of the colloid size of the second solution. This is true because the polymer volatilizes during the pressure/heating step of the process, and, as a result, the polymer does not contribute to bond thickness.

Another exemplary use of the present invention is to provide a sensor probe having a very thin aluminum oxide, electrically nonconductive shim bonded between two blocks of electrically conductive material such as a commercially available two-phase, hard, dense material composed of 70 wt.% Titanium Carbide (TiC) and 30 wt.% Aluminum Oxide ($Al_2O_3$).

The two $TiC.Al_2O_3$ surfaces to be bonded to the $Al_2O_3$ shim are, for example, 2 inches square, as is the shim itself. The shim is in the range of 10 micrometers thick. The blocks of $TiC.Al_2O_3$ are in the range of 4 millimeters thick.

The two $TiC.Al_2O_3$ surfaces are diamond lapped with a 3-micron diamond. Even so, the flatness across the 2-inch surface may be in error as much as 5 microns, as measured from an edge to the center. The $Al_2O_3$ shim is likewise not perfectly flat.

By the method previously described, alternate layers of silica particles and alumina particles are placed on the surfaces to be bonded, to act as filler material, thereby insuring good physical contact between the bonding surfaces. However, in order to decrease the number of processing steps needed to build up the layer thickness, the alumina particles, of the anionic water/colloid solution, found to be most acceptable have particle size of about 0.3 microns. Fifty coats of silica and alumina are adequate to compensate for the lack of flatness of the surfaces to be bonded.

More specifically, the ground and clean $TiC.Al_2O_3$ surfaces to be bonded are first dipped in the aforesaid silica/water colloid solution, since the $TiC.Al_2O_3$ material exhibits a positive electrical charge in the presence of water. The surfaces are then rinsed in deionized water and air dried.

The process is then repeated, using the anionic $Al_2O_3$/water colloid.

This process is repeated until the alternate colloid layers are in the range of from 1 to 3 micrometers thick.

The two $TiC.Al_2O_3$ blocks are then placed with these coated surfaces in contact with the opposite surfaces of a thin, polished, dense alumina sheet which is about 5 to 10 mils thick. Rubber cement can be coated on the edges of this three-piece assembly in order to hold the assembly together for purposes of handling.

The assembly is then placed in a silicon carbide mold, encased in $Al_2O_3$ powder. This mold includes movable pistons which can compress the $Al_2O_3$ powder, and an electrical heater for heating the compressed powder mass.

Thereafter, and in a nitrogen atmosphere, the assembly is subjected to a pressure of about 3000 psi and a temperature of about 1300° C. for about one hour. The mold is then allowed to cool, and the assembly is removed.

As a result of this procedure, the silica and alumina filler layers react with each other and with the alumina portion of the $TiC.Al_2O_3$ members, and with the alumina shim, to produce a eutectic spinel material. The eutectic diffuses into the adjacent materials, losing its identity, thereby leaving a very strong, sharply defined bond line between the $TiC.Al_2O_3$ and the alumina shim.

While the invention has been particularly shown and described with reference to preferred embodiments thereof, it will be understood by those skilled in the art that various changes in form and details may be made therein without departing from the spirit and scope of the invention.

What is claimed is:

1. A method of diffusion bonding one member to another, to form a very thin bond line therebetween, comprising:
   a. providing a first colloid solution having a polarity;
   b. providing a second colloid solution having an opposite polarity;
   c. dipping at least one of said surfaces in said first solution;
   d. removing said one surface, and thereafter washing, to leave a monolayer of said first colloid;
   e. dipping said one surface in said second solution;
   f. removing said one surface, and thereafter washing, to leave a monolayer of said second colloid; and
   g. placing the two surfaces to be in contact in a high-heat/high-pressure environment in order to effect a diffusion bond therebetween, the bond-line thickness being determined by the thickness of at least one of the layers of said first and second colloid.

2. The method of claim 1 including an initial step of cleaning the surfaces to be bonded.

3. The method of claim 2 including the steps of drying said one surface after each of said steps d and f.

4. The method of claim 3 wherein said first solution is a solution of one of colloidal silica or colloidal alumina, said second solution is a solution of the colloid not selected for the first solution, both solutions are of about 1% concentration, and said bond-line thickness is determined by the sum of the thickness of layers of said first and second colloid.

5. The method of claim 4 including the step, performed intermediate steps f and g, of repeating steps c through f, in order to increase the bond-line thickness by increasing the thickness of alternate layers of said first and second colloid.

6. The method of claim 1 wherein said members to be bonded are ceramic, and wherein said first colloid solution is of a negative polarity, and said second colloid solution is of a positive polarity.

7. The method of claim 6 wherein said first solution is an anionic solution of colloidal alumina ($Al_2O_3$), said second solution is a cationic solution of colloidal silica ($SiO_2$), and said bond-line thickness is determined by the sum of the size of said first and second colloid.

8. The method of claim 7 wherein said solutions are of a concentration about 1% and a pH about 4, and including the steps of air-drying said one surface after each of said steps d and f.

9. The method of claim 8 including the step, performed intermediate steps f and g, of repeating steps c through f, in order to increase the bond-line thickness by increasing the thickness of alternate layers of said first and second colloid.

10. The method of claim 6 wherein said members are magnetic ferrite, with said bond-line thickness defining the gap width of a magnetic recording head, and wherein said first solution is an anionic solution of colloidal alumina ($Al_2O_3$), said second solution is a cationic solution of colloidal silica ($SiO_2$), and said bond-line thickness is determined by the sum of the layers of said first and second colloid.

11. The method of claim 9 wherein the solution concentrations are about 1% and pH about 4.

12. The method of claim 1 wherein said one of said surfaces is electrically conductive and exhibits a positive electrical charge in the presence of water, wherein said first colloidal solution is an anionic solution of alumina particles about 0.3 microns in size, wherein said one surface is bonded to one side of an alumina shim, and including the additional step of providing a second electrically conductive surface of positive electrical charge which has been coated by operation of steps a through f and is bonded to the opposite surface of said alumina shim.

* * * * *